(12) United States Patent
Ito et al.

(10) Patent No.: US 6,561,338 B2
(45) Date of Patent: May 13, 2003

(54) CARRIAGE CONVEYING APPARATUS

(75) Inventors: Akira Ito, Yokkaichi (JP); Hajime Kato, Yokkaichi (JP); Kiyokazu Kurihara, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 36 days.

(21) Appl. No.: 09/728,093

(22) Filed: Dec. 1, 2000

(65) Prior Publication Data

US 2001/0002645 A1 Jun. 7, 2001

(30) Foreign Application Priority Data

Dec. 2, 1999 (JP) .......................... 11-343140

(51) Int. Cl.[7] .................. B65G 43/00; B65G 15/64; B65G 21/22; B65G 47/22; B65G 47/24
(52) U.S. Cl. ............... 198/341.05; 198/346.1; 198/465.1
(58) Field of Search .......... 198/341.05, 465.1, 198/465.4, 346.1; 104/162

(56) References Cited

U.S. PATENT DOCUMENTS

| 2,028,008 A | | 1/1936 | Peyinghaus | |
| 4,449,625 A | * | 5/1984 | Grieben et al. | 198/465.1 |
| 4,503,596 A | * | 3/1985 | Ida et al. | 198/341.05 |
| 4,507,841 A | * | 4/1985 | Rickert | 137/15.18 |
| 4,553,321 A | * | 11/1985 | Zihlmann et al. | 198/341.03 |
| 4,725,182 A | * | 2/1988 | Sakamoto et al. | 198/465.1 |
| 4,850,473 A | * | 7/1989 | MacWilliams et al. | 198/463.6 |
| 5,044,069 A | * | 9/1991 | Asai et al. | 198/465.1 |

FOREIGN PATENT DOCUMENTS

| EP | 0 387 487 | 9/1990 |
| FR | 2 444 535 | 7/1980 |
| GB | 2 336 693 | 10/1999 |
| JP | 57066833 | 4/1982 |

* cited by examiner

Primary Examiner—Christopher P. Ellis
Assistant Examiner—Gene O. Crawford
(74) Attorney, Agent, or Firm—Anthony J. Casella; Gerald E. Hespos

(57) ABSTRACT

A carriage conveying apparatus is provided to efficiently circulate push carriages (110) even in a limited space. The apparatus includes forward and return paths (PH1, PH2) for push carriages (110). The return path (PH2) is provided immediately below the forward path (PH1). The push carriages (110) are made transferable from one to the other of the paths (PH1, PH2) by a pair of elevated conveyors (120, 140). In addition, the return path (PH2) is inclined so that the push carriages (110) return from an upstream side of the return path (PH2) to a downstream side thereof by the action of gravity.

5 Claims, 15 Drawing Sheets

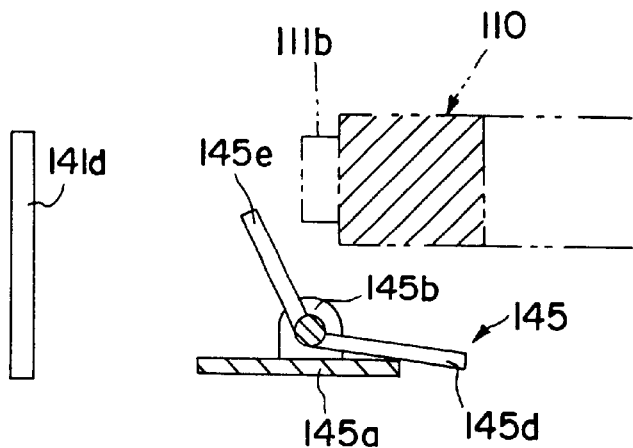
F I G. 13(A)
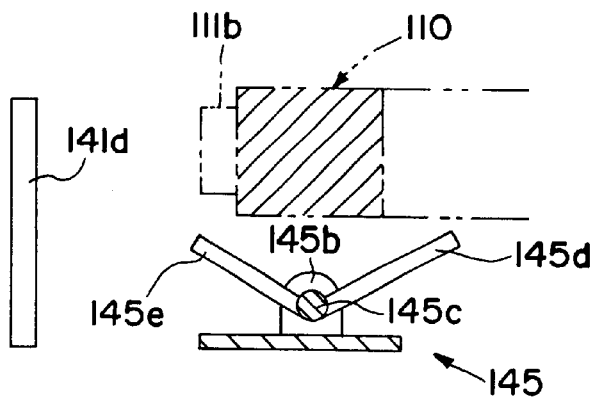
F I G. 13(B)
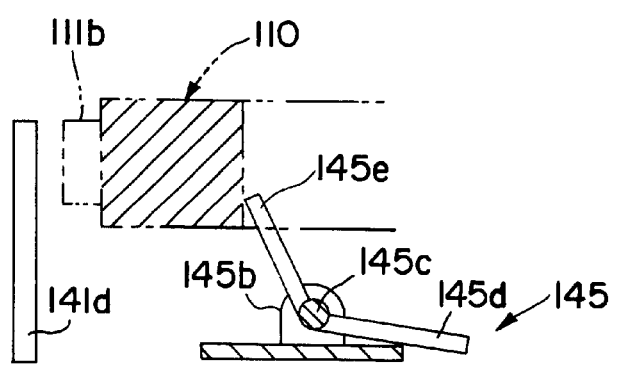
F I G. 13(C)

CARRIAGE CONVEYING APPARATUS

BACKGROUND OF THE INVENTION

1. Field of the Invention

The present invention relates to a carriage conveying apparatus and, particularly to an elevated carriage conveying apparatus for moving push carriages conveyed by operators from one work station to another.

2. Description of the Related Art

Work boards or wire laying boards generally are used to produce wiring harnesses. The wire laying boards are disposed on carriages that circulate on a conveyance path of an endless conveyor. However, some wire laying boards are placed on push carriages, which are conveyed by hand and are circulated from one work station to another.

A carriage conveying apparatus that uses the aforementioned push carriages needs to be installed in a relatively concentrated layout and the individual carriages need to be circulated in a very limited space. However, an inexpensive conveying apparatus that can circulate push carriages in a small space has not yet been developed. Such a carriage conveying apparatus could be connected with a main conveyor for assembling a plurality of sub-modules into a wiring harness. However, the connected conveying apparatus would take up a large space, and would disadvantageously enlarge a work line.

In view of the above, an object of the invention is to provide an inexpensive carriage conveying apparatus that can efficiently circulate carriages even in a limited space, and that can particularly push carriages in a limited space.

SUMMARY OF THE INVENTION

The subject invention is directed a carriage conveying apparatus that comprises a forward path for moving carriages substantially linearly from one work station to another, and a return path for moving the carriages from a downstream end of the forward path to an upstream end thereof. Thus, the carriages can be transferred easily from one path to the other.

The return path for circulating the carriages is formed immediately below the forward path for conveying the carriages from one work station to another. Thus, a circulating path that is compact in plan view can be constructed. Even if this elevated carriage conveying apparatus is connected with a main conveyor in a branched manner to construct a production line, it can be installed in a maximally concentrated layout.

According to a preferred embodiment of the invention, the return path is inclined such that the carriages return from an upstream side of the return path to a downstream side thereof at least partly by the action of gravity.

Preferably, the carriages are conveyed from the upstream end of the forward path to the downstream end thereof by being pushed by the operators.

The conveyors may comprise elevating tables that can elevated and lowered between upper and lower transfer positions. The carriages can be transferred between the upper transfer position and the forward path. Similarly, the carriages can be transferred between the lower transfer positions and the return path. The conveyors may further comprise driving units for elevating and lowering the elevating tables between the upper and lower transfer positions.

The carriage conveying apparatus preferably comprises at least one position detecting means for detecting elevated and/or lowered positions of the elevating tables in the corresponding transfer positions. Additionally, the carriage conveying apparatus preferably comprises a control unit for controlling operations of the driving units in accordance with signals from the position detecting means. Most preferably, the control unit permits the elevating table at the upstream side of the return path to be lowered only when the elevating table at the downstream side of the return path is in the lower transfer position.

The elevated conveyors enable the carriages to be transferred from the downstream end of the return path to the elevating table even if the carriages are conveyed from the upstream side to the downstream side of the return path by the action of gravity.

Preferably, carriage detection sensors are provided in the upper and lower transfer positions of the respective elevated conveyors for detecting the presence of a carriage. The carriage detection sensors are connected with the control unit such that detection signals can be inputted to the control unit. In such a case, the control unit can execute a more precise control.

Each driving unit may comprise a parallel link or pantograph system for supporting the elevating table such that the elevating table can be elevated and lowered, and preferably a single air cylinder for driving the parallel link. With such a driving unit, each elevating table can be elevated and lowered between the upper and lower transfer positions by the single air cylinder.

The conveyors may comprise temporary holding means for temporarily or releasably holding or locking the carriage positioned thereon during the transfer from one path to the other.

These and other objects, features and advantages of the present invention will become apparent upon reading of the following detailed description of preferred embodiments and accompanying drawings.

BRIEF DESCRIPTION OF THE DRAWINGS

FIGS. 13 and 14 are diagrams schematically showing an operation of the elevated conveyor of FIG. 10.

DETAILED DESCRIPTION OF THE PREFERRED EMBODIMENT

Figure 1:
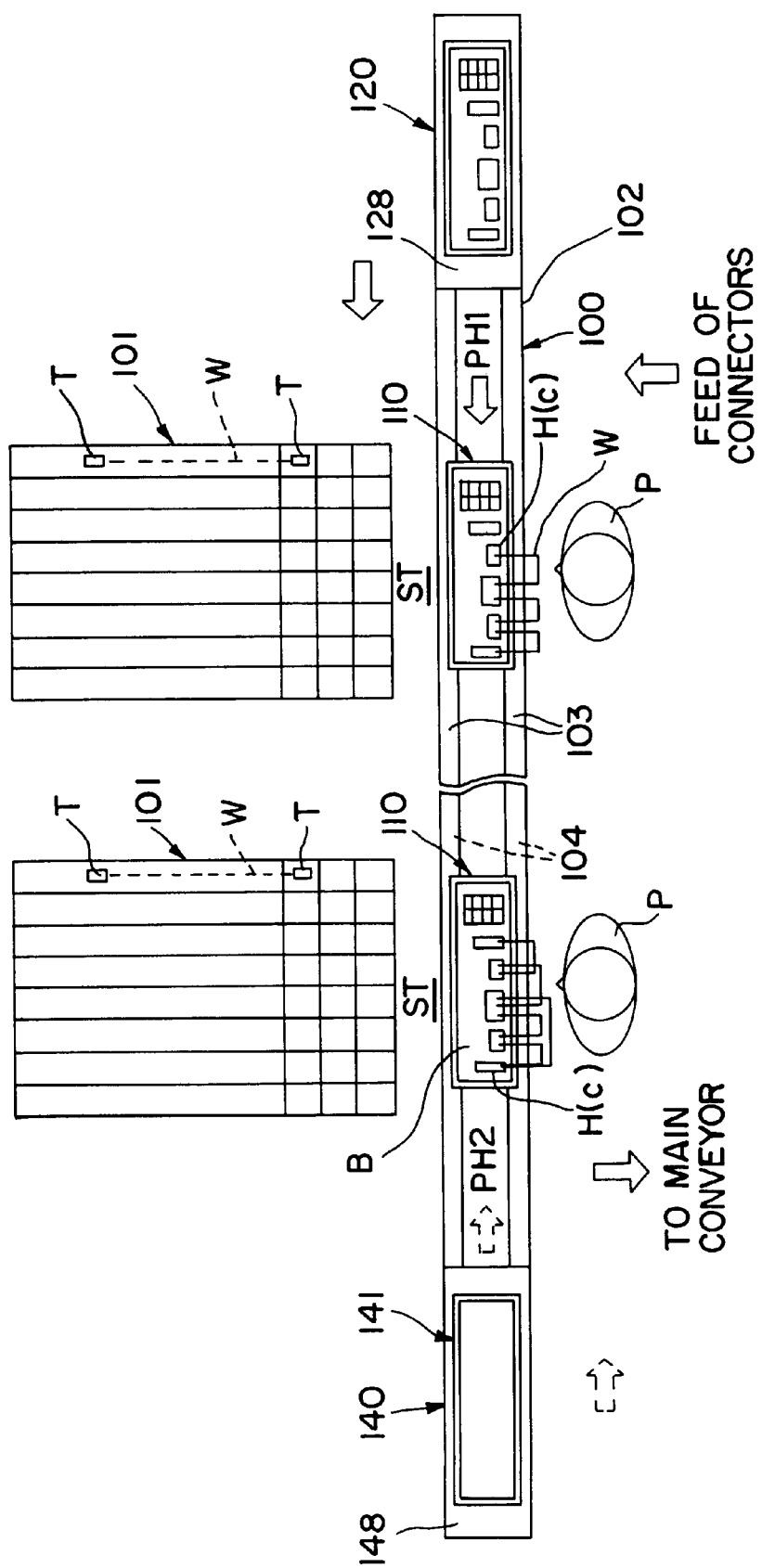
FIG. 1 is a schematic plan view of an elevated carriage conveying apparatus according to one embodiment of the invention.
Figure 2:
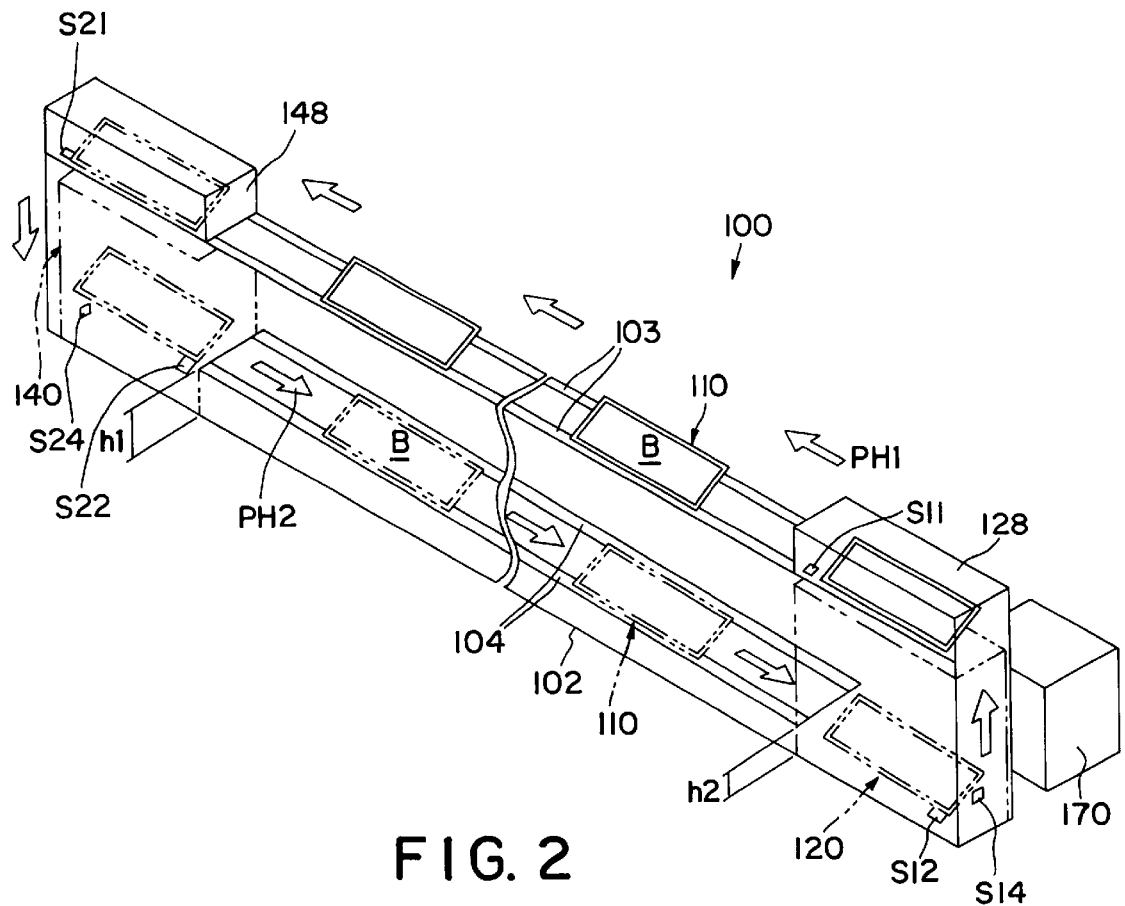
FIG. 2 is a perspective view schematically showing the schematic construction of the elevated carriage conveying apparatus of FIG. 1.

An elevated carriage conveying apparatus according to the invention is identified generally by the numeral 100 in FIGS. 1 and 2. The carriage conveying apparatus 100 is adapted to move or push movable carriages 110 substantially linearly from one work station ST to another so that a specified processing can be performed at each work station ST. In the illustrated example, a stocking table 101 is provided for each work station ST. The stocking tables 101 are provided for stocking sorted wires W that have specified lengths and that have terminals T connected with both ends thereof. Each push carriage 110 has a wire laying board B on which connector holders H are provided for holding connectors C. A specified submodule (wiring harness) is to be formed by successively inserting the wires W into the corresponding connectors C at the respective work stations ST. Even though the following description is given with respect to push carriages 110, it is to be understood that any other kind of carriage or moving means that is driven or that has an internal driving means may be used.

The elevated carriage conveying apparatus 100 has a frame 102 that forms an entire outer configuration, as shown in FIG. 2. The frame 102 is formed e.g. by assembling a plurality of angles or brackets substantially into a box extending along a forward path PHi e.g. by welding. The forward path PH1 is formed on top of the frame 102 for moving the carriages 110 from one work station ST to another along rails 103 (see FIG. 3) that are formed by substantially L-shaped angles or brackets.

A return path PH2 is formed in a bottom part of the frame 102 and is defined substantially by rails 104. The return path PH2 is provided substantially immediately below the forward path PH1 for returning the push carriages 110 that have reached a downstream end of the forward path Ph1 to an upstream end of the forward path PH1. Elevators or elevating conveyors 120, 140 are provided at the substantially opposite sides of the paths PH1, PH2. The push carriages 110 can be moved from one path PH1 (PH2) to the other path PH2 (Ph1) by the elevated conveyors 120, 140, thereby defining an endless conveyor. In the illustrated embodiment, the rails 104 that form the return path PH2 preferably are inclined by setting a height H1 at the upstream end larger than a height H2 at the downstream end. Thus, the push carriages 110 can return from the upstream end to the downstream end by the action of gravity as described later.

Figure 3:
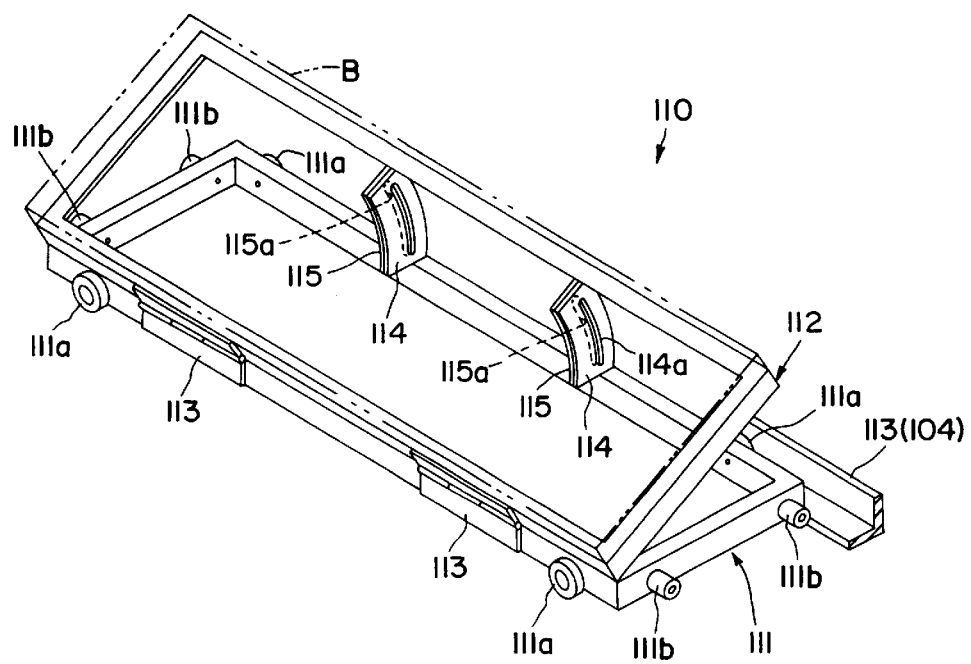
FIG. 3 is a perspective view of a push carriage used in the elevated carriage conveying apparatus of FIG. 1.
Figure 4:
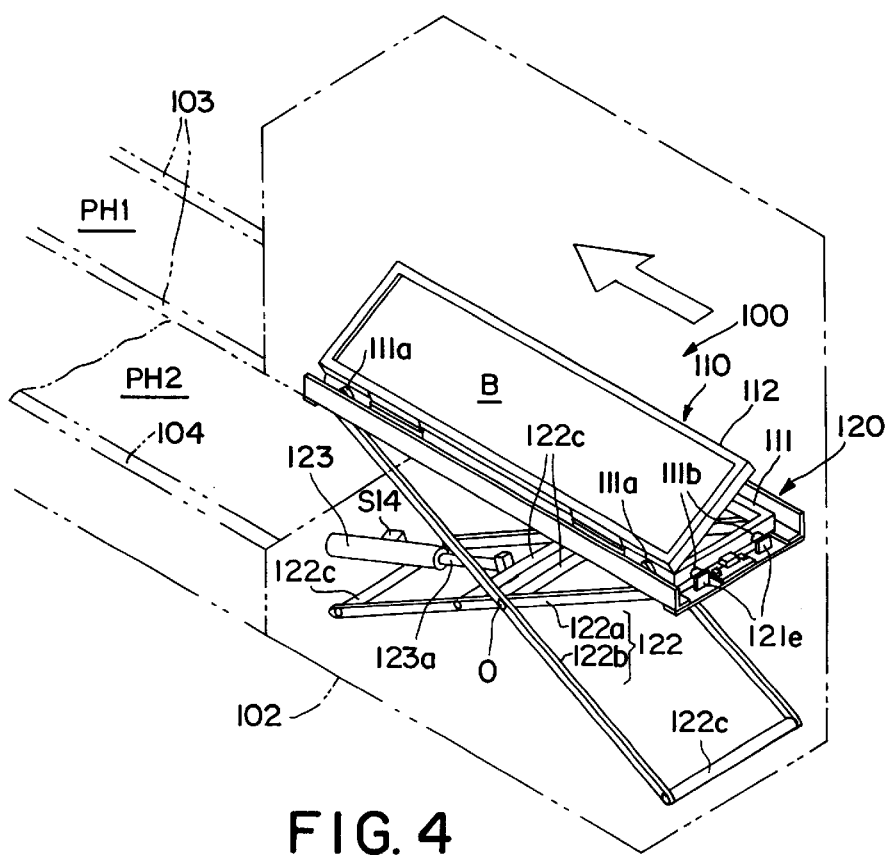
FIGS. 4 to 7 are perspective views showing the schematic construction of a forwarding elevated conveyor for transferring a received push carriage from the downstream end of a return path to the upstream end of a forward path.
Figure 5:
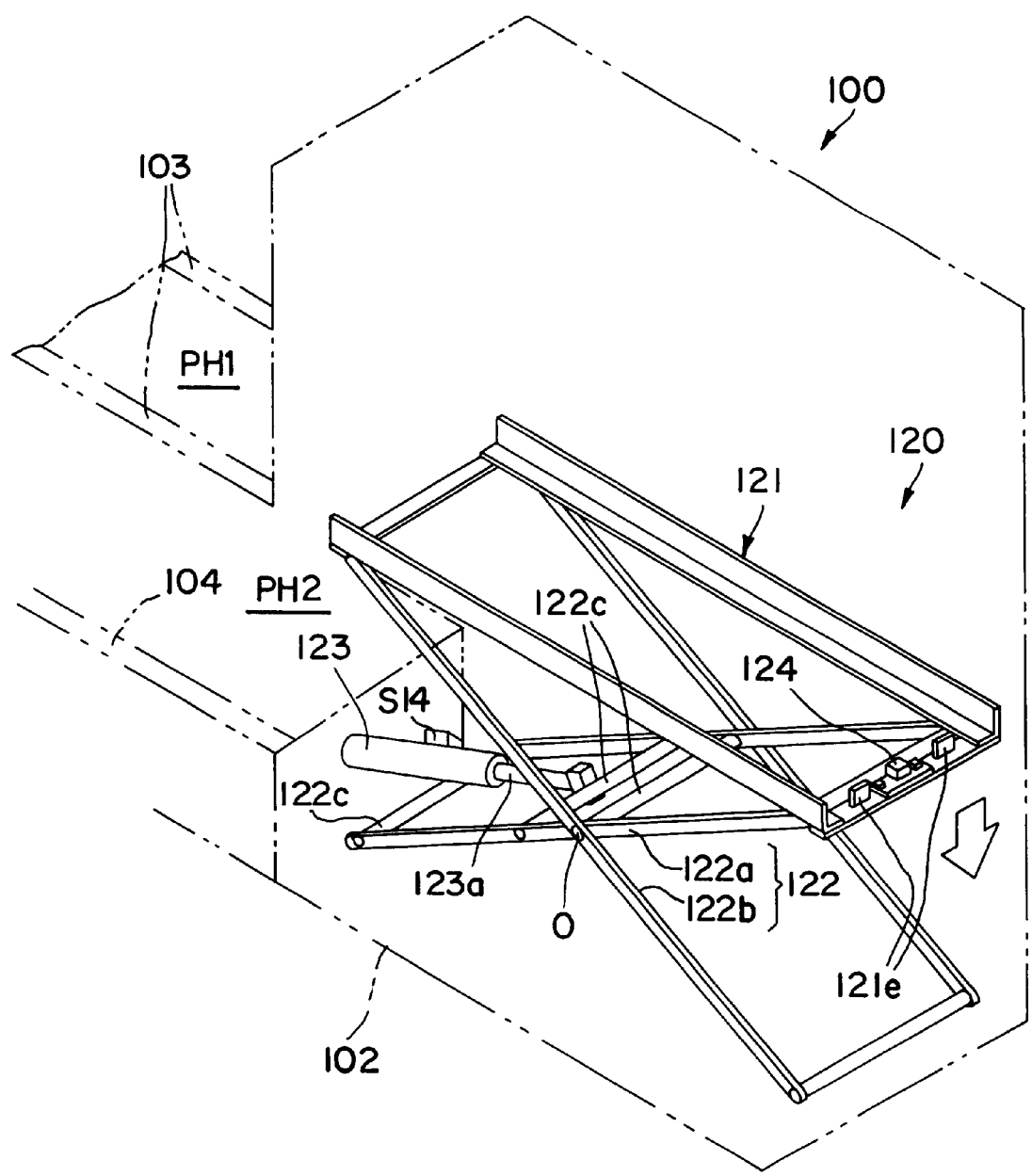

With reference to FIG. 3, the push carriage 110 includes a frame-shaped base 111 and a board frame 112 supported on the base 111. The base 111 is formed e.g. by welding pipes to have a substantially rectangular shape in plan view, and rollers 111a are mounted on its longer side surfaces (only one side is shown in FIG. 3). The base 111 is horizontally movable by rolling the rollers 111a on the rails 103 (or rails 104). A pair of elastic stoppers 111b, which preferably are made of rubber, are mounted on each of the shorter side surfaces of the base 111.

The board frame 112 is adapted to hold the wire laying board B shown in phantom line, and is assembled e.g. by welding angles or brackets to have substantially the same shape in plan view as the base 111. The board frame 112 and the base 111 are coupled on one side by a pair of hinges 113 so that the board frame 112 can be inclined toward an operator. Further, two mounting plates 114 are cantilevered fixedly from the side of the base 111 opposite the hinges 113, and two mounting plates 115 are cantilevered fixedly from the side of the board frame 112 opposite the hinges 113. The mounting plates 114 on the base 111 and the mounting plates 115 on the board frame 112 are provided in positions where they can be joined together. Additionally, the respective mounting plates 114, 115 are formed with oblong holes 114a, 115a that extend along an arc substantially centered on the center of rotation of the hinges 113. The board frame 112 and the base 111 can be assembled, such that the board frame 112 is inclined by a specified angle. The board frame 112 and the base 111 can be held at the specified angle by joining or fixedly connecting the mounting plates 114, 115, relative to each other, preferably by means of unillustrated bolts inserted through the oblong holes 114a, 115a and nuts. In other words, an angle of inclination of the board frame 112 can be adjusted by changing a position of joining the mounting plates 114, 115 together along the extension of the oblong holes 114a, 115a.

FIGS. 4 to 7 are perspective views that show the schematic construction of the forwarding elevating or elevated conveyor 120 for transferring the carriages 110 from the downstream end of the return path PH2 to the upstream end of the forward path PH1. With reference to FIGS. 4 to 7, the elevated conveyor 120 includes a substantially rectangular elevating table 121, which in operation is opposed substantially vertically to the push carriage 110. The elevated conveyor 120 also includes a parallel link 122 for linking the elevating table 121 and the push carriage 110, and an air cylinder 123 that functions as an actuator for moving the elevating table 121 upward and downward or between the forward and return paths PH1, PH2. The elevating table 121 preferably is a frame member formed by assembling angles. The parallel link 122 is constructed as a pantograph system by connecting intermediate positions of two pairs of link arms 122a, 122b by a connecting shaft 122c that extends in widthwise direction. More particularly, the link arms 122a and 122b are connected to have an X-shape in front view. Additionally, the link arms 122a, 122b are coupled such that, for example, ends at the downstream end of the return path PH2 are fixed while ends at the upstream end of the forward path PH1 are substantially vertically slidable with an intersection O of the link arms 122a and 122b as a center. Thus, the elevating table 121 can be moved smoothly upward and downward between an upper transfer position (see FIGS. 4 and 5) where the push carriage 110 is or can be transferred to the upstream end of the forward path PH1 and a lower transfer position (see FIG. 6) where the push carriage 110 is transferred from the downstream end of the return path PH2.

The air cylinder 123 preferably is fixed and is aligned obliquely with respect to the frame 102. A rod 123a is movable into or out of the air cylinder 123, and is coupled to a movable side of the parallel link 122. Thus, the elevating table 121 is raised by extending the rod 123a from the air cylinder 123, and is lowered by contracting the rod 123a into the air cylinder 123.

Figure 6:
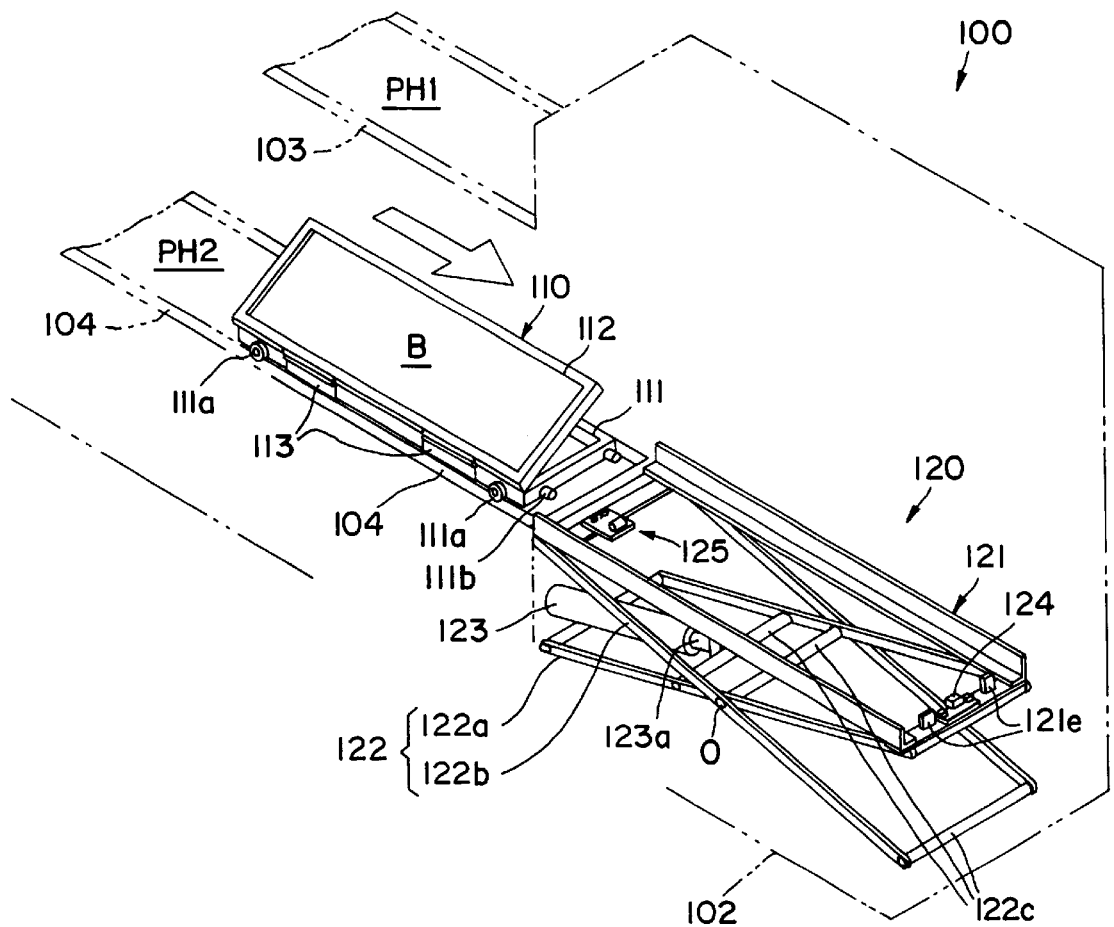
Figure 7:
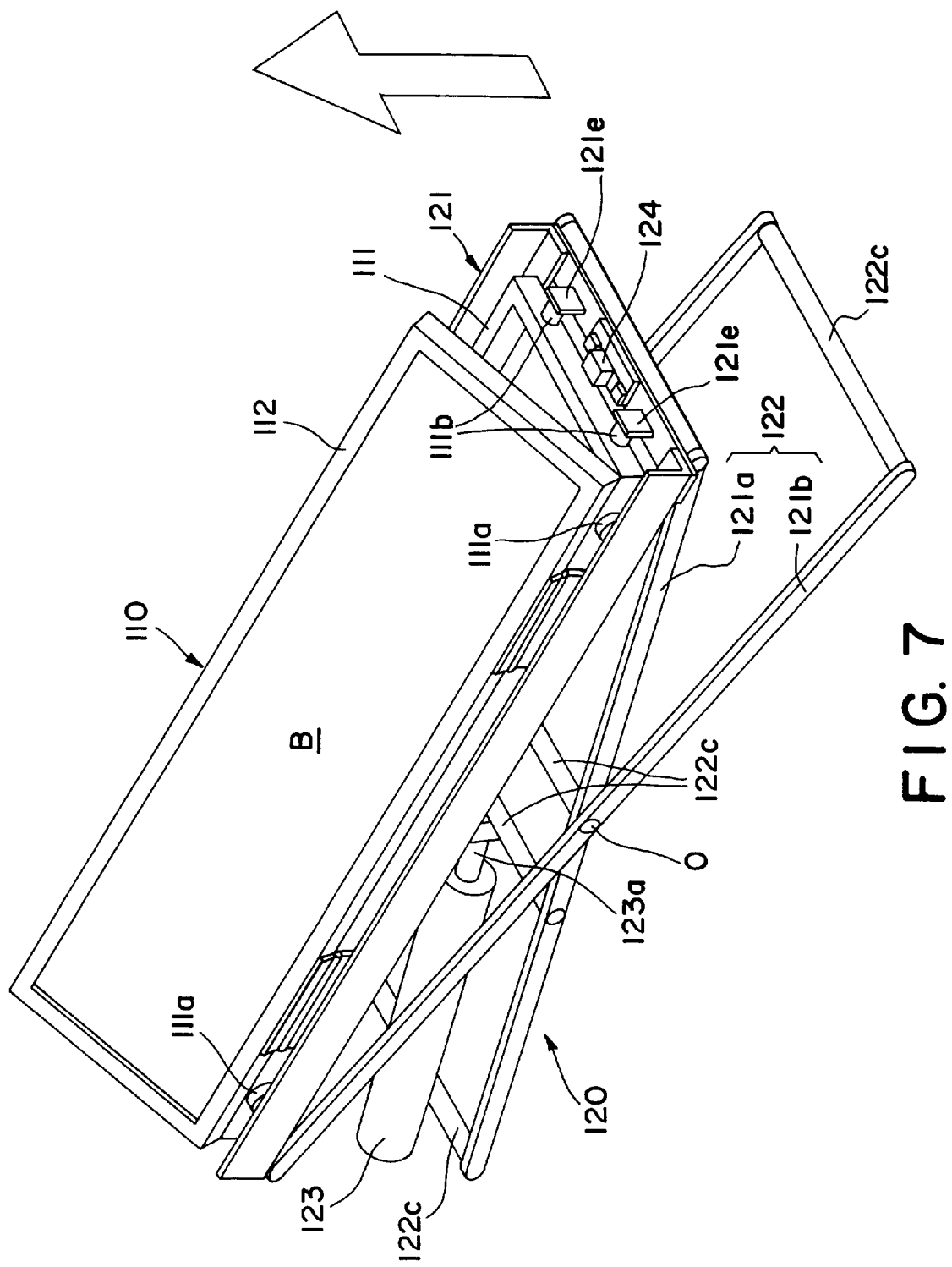
Figure 8:
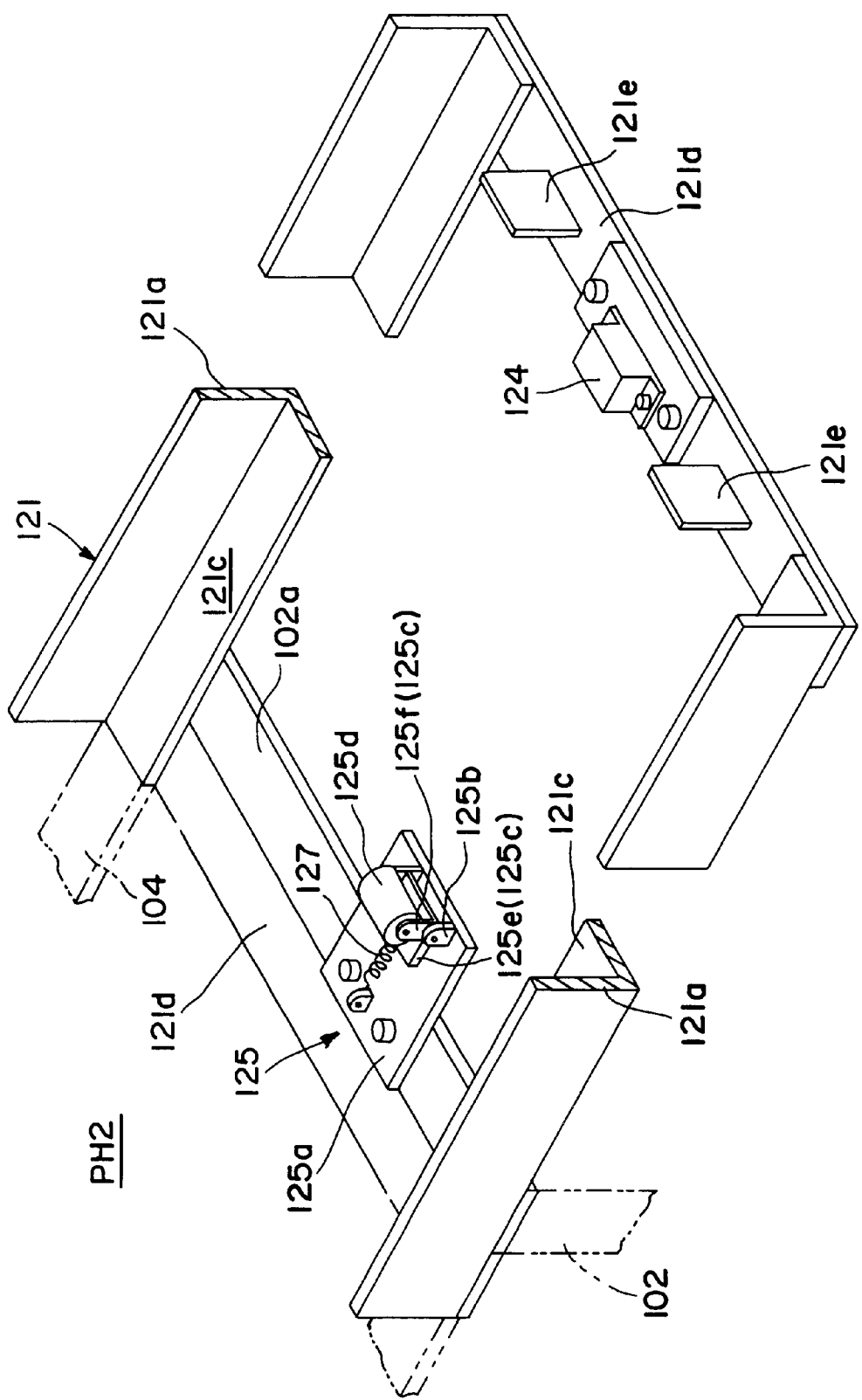
FIG. 8 is a perspective view partly cut away showing a portion of an elevating table of the elevated conveyor of FIG. 5.

FIG. 8 is a perspective view partly cut away showing a portion of the elevating table 121 of the elevated conveyor shown in FIGS. 4 to 7. As shown in FIG. 8, the longer sides of the elevating table 121 are formed by arranging a pair of L-shaped angles or brackets 121a substantially symmetrically to face each other, and ends are formed by welding flat angles or brackets 121d to the lower surfaces of the angles 121a.

The rails 121c formed by the L-shaped angles 121a are substantially flush with the upper surfaces of the corresponding rails 103, 104 in the respective transfer positions, so that the push carriages 110 can be transferred or received smoothly.

Contact plates 121e stand on the flat angle 121d located distant from the paths PH1, PH2. The contact plates 121e are disposed at locations on the flat angle 121d to align with the rubber stoppers 111b of the push carriage 110. A magnet 124 is provided at a location on the flat angle 121d between the contact plates 121e, and functions to attract the base 111 of the push carriage 110. Thus, the elevating table 121 can detachably lock the push carriage 110 transferred onto the elevating table 121. In the illustrated example, the frame 102 is provided with a reverse movement preventing mechanism 125 to prevent the push carriage 110 transferred from the return path PH2 onto the elevating table 121 from moving in a reverse direction.

As shown in FIGS. 8, the reverse movement preventing mechanism 125 is provided with a base 125a secured to the flat angle 102a of the frame 102 closer to the paths PH1, PH2. The reverse movement preventing mechanism 125 also has a pivot 125b rotatably supported on the base 125a along a horizontal direction substantially perpendicular to a returning direction. A roller arm 125c is supported pivotally via the pivot 125b, and a stopper roller 125d is supported rotatably on the roller arm 125c.

As shown in FIG. 9, the roller arm 125c is substantially L-shaped and is comprised of a bottom plate 125e and an arm portion 125f. The bottom plate 125e is placed on the base plate 125a at an angle different from 0° or 180°, and preferably substantially normal to the base 125a. The arm portion 125f stands integrally on the bottom plate 125e. More particularly, the arm portion 125f is at the downstream end of the bottom plate 125e with respect to the returning direction in which the push carriage 110 is guided onto the elevating table 121 from the return path PH2. The stopper roller 125d is supported rotatably at the upper end of the arm portion 125f.

A tension coil spring 127 has one end fixed to the base 125a at the upstream end of the bottom plate 125e with respect to the returning direction. Thus, the roller arm 125c is biased by the spring 127 in a direction to stand on the base 125a.

The stopper roller 125d is located in a contact position where it is in contact with the downstream end face of the push carriage 110 on the upstream end of the return path PH2 when the roller arm 125c is standing. However, the stopper roller 125d is lowered to permit passage of the push carriage 110 when the roller arm 125c is rotated against a biasing force of the tension coil spring 127.

Figure 9A:
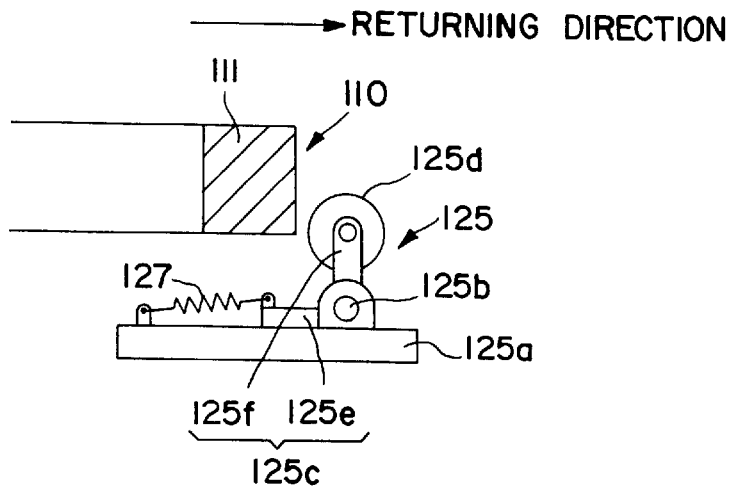
FIG. 9 is a diagram showing an operation of a reverse movement preventing mechanism shown in FIG. 8.
Figure 9B:
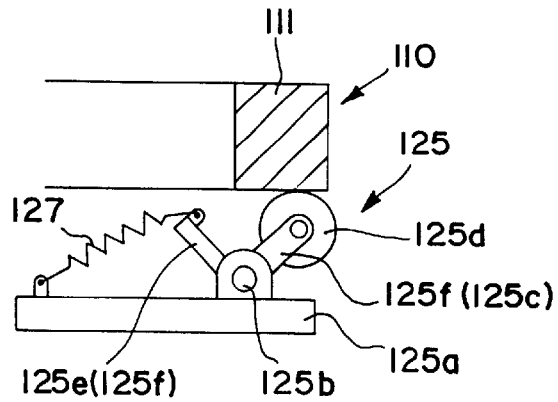
Figure 9C:
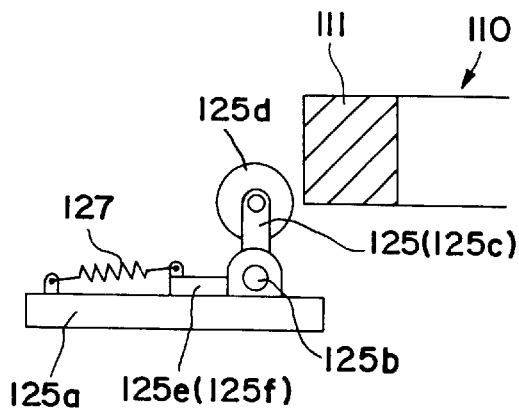

When the push carriage 110 is moved in the returning direction to contact the stopper roller 125d as shown in FIG. 9(A), the roller arm 125c is rotated clockwise to permit the push carriage 110 to be guided onto the elevating table 121 as shown in FIG. 9(B). After the push carriage 110 is guided onto the elevating table 121, the stopper roller 125d is engaged with the downstream end face of the push carriage 110 with respect to the returning direction as shown in FIG. 9(C), thereby preventing the push carriage 110 from moving in a direction opposite from the returning direction.

Next, with reference to FIGS. 10 to 14, the returning or elevated conveyor 140 is described in detail. The returning elevated conveyor 140 includes an elevating table 141, a parallel link 142, an air cylinder 143 and the like similar to the forwarding elevated conveyors 120. The elevating table 141 can be moved upward and downward smoothly between an upper transfer position (see FIG. 10), where the push carriage 110 is transferred from the downstream end of the forward path PH1, and a lower transfer position (see FIG. 11), where the push carriage 110 is transferred to the upstream end of the return path PH2. In other words, the push carriages 110 move over the forward path PH1 where assembling or mounting operations (e. g. wire laying, bundling and/or connecting operations) are performed. The push carriages 110 then reach the first elevating table 141, which transfers the push carriages 110 from the downstream end of the forward path PH1 to the upstream end of the return path PH2. The push carriages 110 then can move in a direction substantially opposed to the direction of movement of the forward path PH1 so as to reach the second elevating table 121 at the downstream end of the return path PH2. The second elevating table transfers 121 transfers the push carriages 110 back to the upstream end of the forward path PH1. Accordingly, the push carriages 110 can be circulated over the forward path PH1, the first elevating table 141, the return path PH2 and the second elevating table 121 in this order. Thus, the push carriages 110 that have reached the downstream end of the forward path PH1 can be cycled to the upstream end of the forward path PH1 by returning them via the first elevating table 141, the return path PH2 located below the forward path PH1 and the second elevating table 121.

Figure 10:
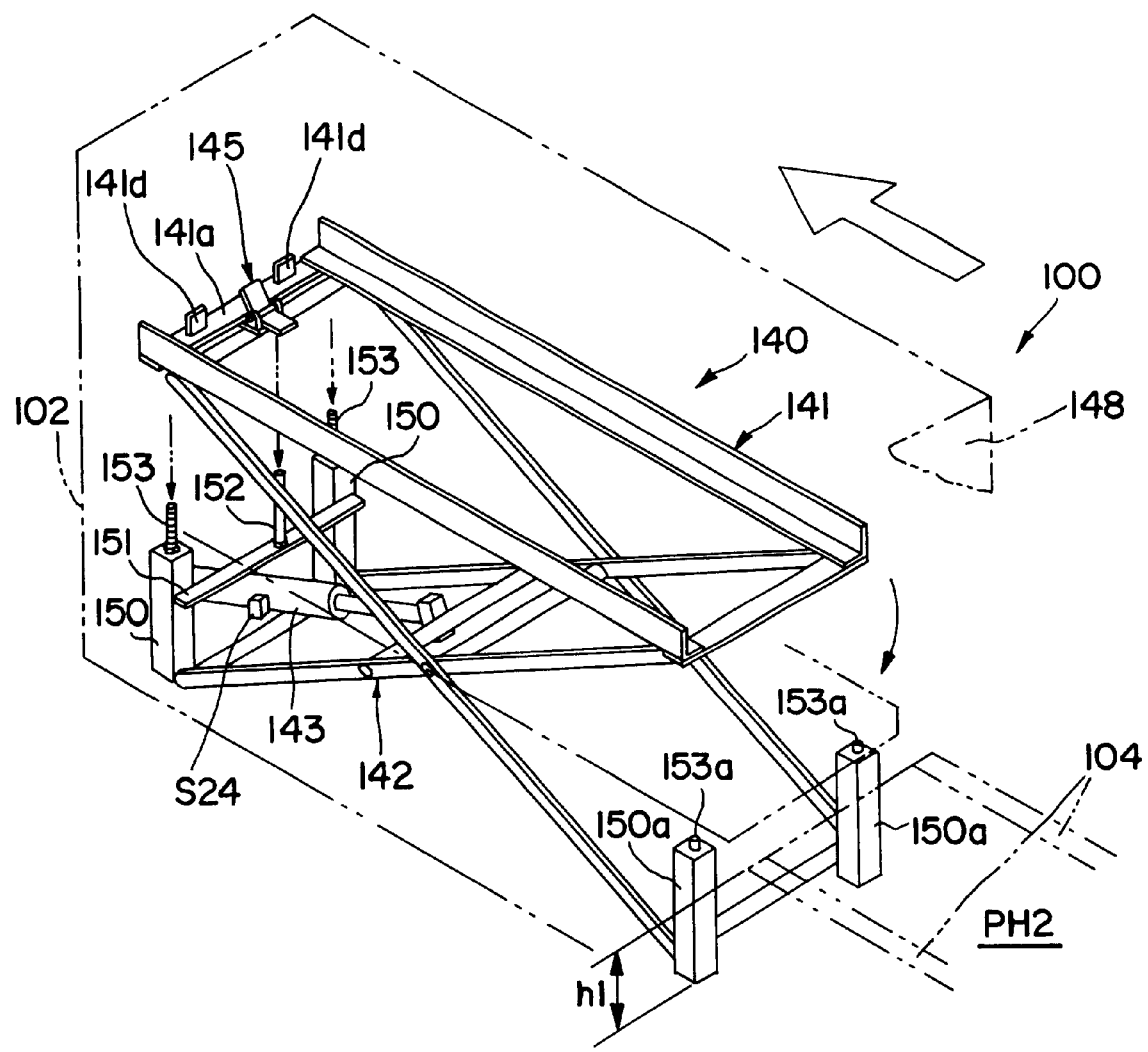
FIGS. 10 and 11 are perspective views showing the schematic construction of a returning elevated conveyor.

The elevating table 141 has a flat angle or bracket 141a located distant from the paths PH1 and PH2, as shown in FIG. 10. Contact plates 141d stand on the flat angle 141a at locations to align with the rubber stoppers 111b (see FIG. 11) of the push carriage 110. Further, a turning plate mechanism 145 is provided between the contact plates 141d. The turning plate mechanism 145 cooperates with the contact plates 141d to hold the base 111 of the push carriage 110.

Figure 12:
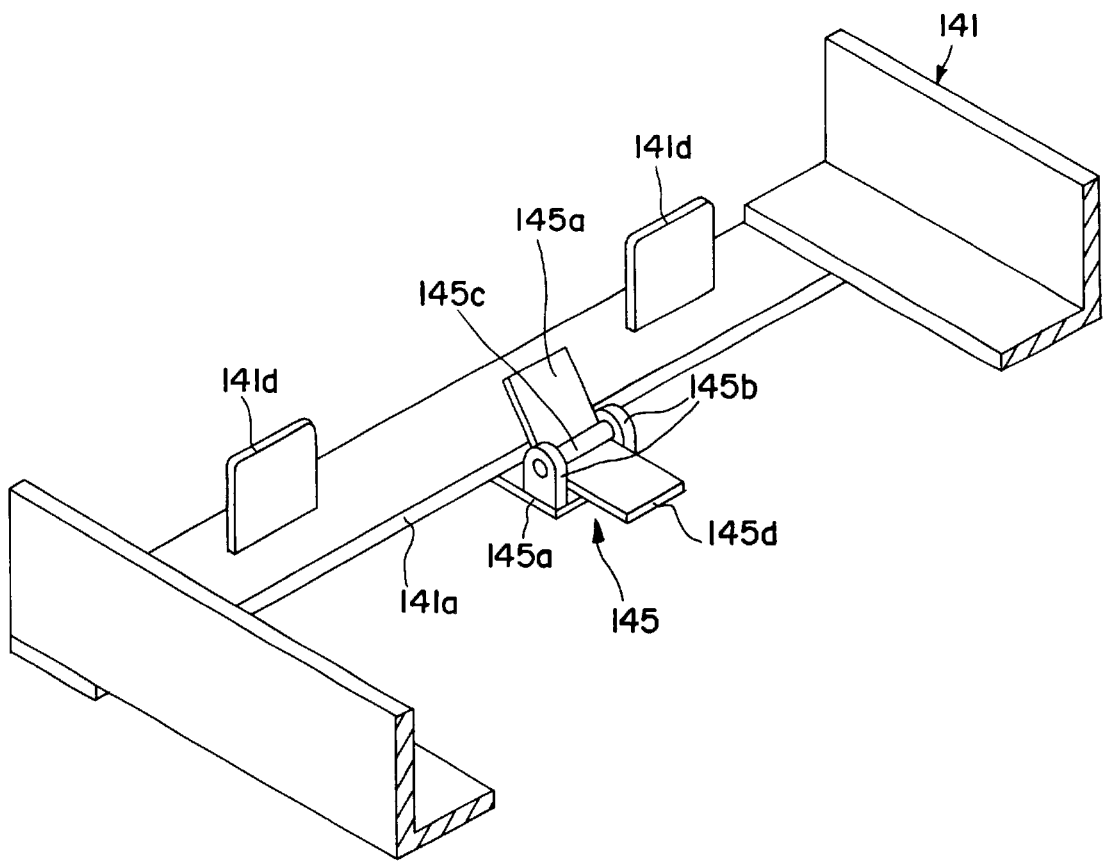
FIG. 12 is an enlarged perspective view showing a portion of the elevated conveyor of FIG. 10.

As shown in FIG. 12, the turning plate mechanism 145 includes a base 145a fixed to the flat angle 141a, bearings 145b standing on the base 145a, a pivot 145c rotatably supported by the bearings 145b in a substantially horizontal direction perpendicular to the forward path PH1, and first and second plates 145d, 145e welded to the pivot 145c.

The plates 145d, 145e extend radially and are spaced apart by a specified angle different from 0° or 180° about the pivot 145c. The first plate 145d is displaceable between first and second positions. In the first position, the first plate 145d can contact an end of the base 145a by the action of gravity and a leading end of the first plate 145d projects from the end of the base 145a. In the second position, the first plate 145d is spaced from the end of the base 145a. The second plate 145e extends obliquely to face an end face of the push carriage 110 when the first plate 145d is in contact with the base 145a. However, the second plate 145e is retracted below the push carriage 110 when the first plate 145d is spaced from the end of the base 145a. As a result, when the push carriage 110 is guided from the forward path PH1 as shown in FIG. 13(A), the second plate 145e is pushed to rotate or pivot by the push carriage 110, thereby permitting the push carriage 110 to move forward until the rubber stoppers 111b (see FIG. 3) of the push carriage 110 contact the corresponding contact plates 141d. After reaching this state, the plates 145d, 145e are left in their free states in the base 111 of the push carriage 110. Thus, the first plate 145d returns to contact the base 145a again by the action of gravity, and the second plate 145e faces the rectangular pipe of the base 111 of the push carriage 110, as shown in FIG. 13(C), to prevent the push carriage 110 from moving in a reverse direction. Alternatively or additionally, a biasing means, such as a spring, may be provided to replace or sustain the action of gravity.

Figure 14A:
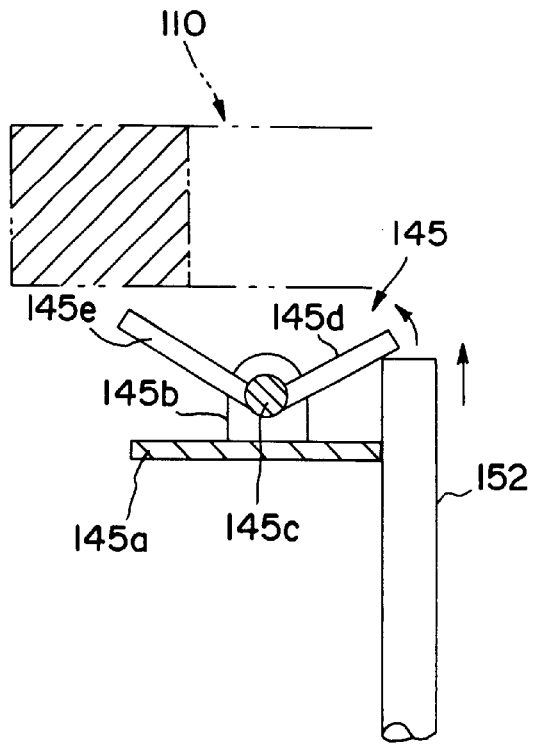

With reference to FIG. 10, the frame 102 includes two pillars 150 and an angle or bracket 151 that extends horizontally between the pillars 150. A rod 152 stands on the angle or bracket 151 to turn the plate mechanism 145 for releasing the locking of the push carriage 110. The rod 152 is immediately below a free end of the first plate 145d and in contact with the base 145a of the turning plate mechanism 145. Thus the rod 152 pushes the first plate 145d up as shown in FIG. 14(A) while the elevating table 141 is being lowered. Accordingly, the turning plate mechanism 145 releases the locking of the push carriage 110.

Figure 14B:
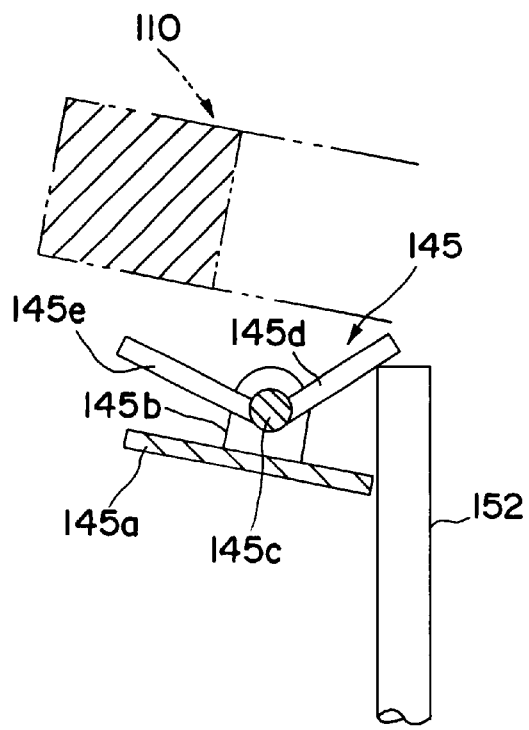

Bolts or contact bars 153 stand on the respective pillars 150, as shown in FIG. 10. The contact bars 153 contact the downstream end of the elevating table 141 with respect to the forward direction so as to incline the lowered elevating table 141 as shown in FIG. 14(B). As a result, the push carriage 110 on the inclined elevating table 141 moves onto the rails 104 on the return path PH2 by the action of gravity, and moves further to the forwarding elevated conveyor 120. In the illustrated example, two pillars 150a are provided at a side opposite from the pillars 150, and contact bars 153a for height adjustment are provided on top of the pillars 150a to adjust the inclination.

With reference to FIG. 2, the elevated conveyors 120, 140 are provided with upper presence sensors S11, S21 for detecting the presence of the push carriage 110 in the upper transfer positions and lower presence sensors S12, S22 for detecting the presence of the push carriage 110 in the lower transfer positions. Elevated position sensors S14 (see FIG. 5) and S24 (see FIG. 10) are provided for detecting whether the respective elevating tables 121, 141 are in the upper or lower transfer positions depending on the driven states of the respective cylinders 123, 143. Safety covers 128 and 148 substantially cover the push carriages 110 in the upper transfer positions, as shown in FIG. 2.

Figure 15:
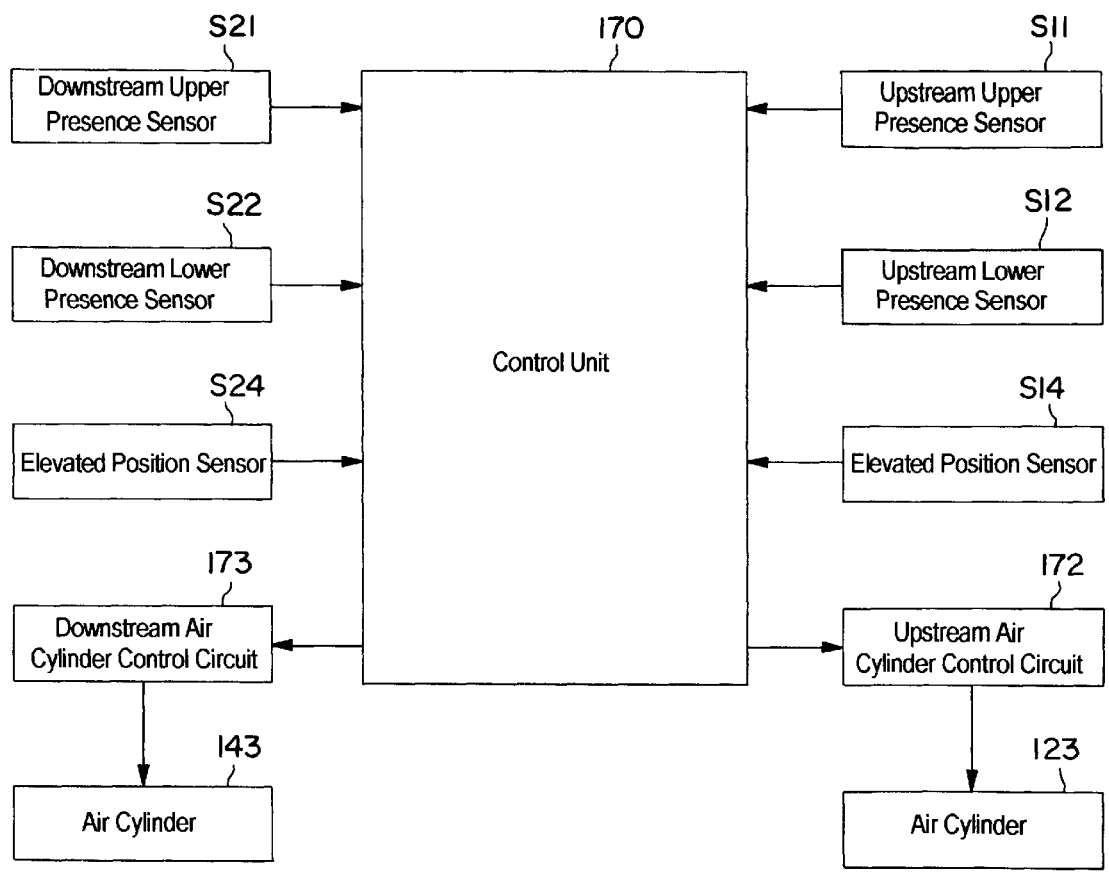
FIG. 15 is a block diagram showing a control unit of the embodiment of FIG. 1.

With reference to FIGS. 2 and 15, the carriage conveying apparatus 100 is provided with a control unit 170 for controlling operation timings of the respective elevated conveyors 120, 140. The control unit 170 is comprised of a microprocessor or like electronic device, and detection signals from the respective sensors S11, S21, S12, S22, S14, S24 can be inputted to the control unit 170. Further, the control unit 170 can control pressurized air supplying circuits 172, 173 for supplying a pressurized air to the air cylinders 123,143.

Figure 16:
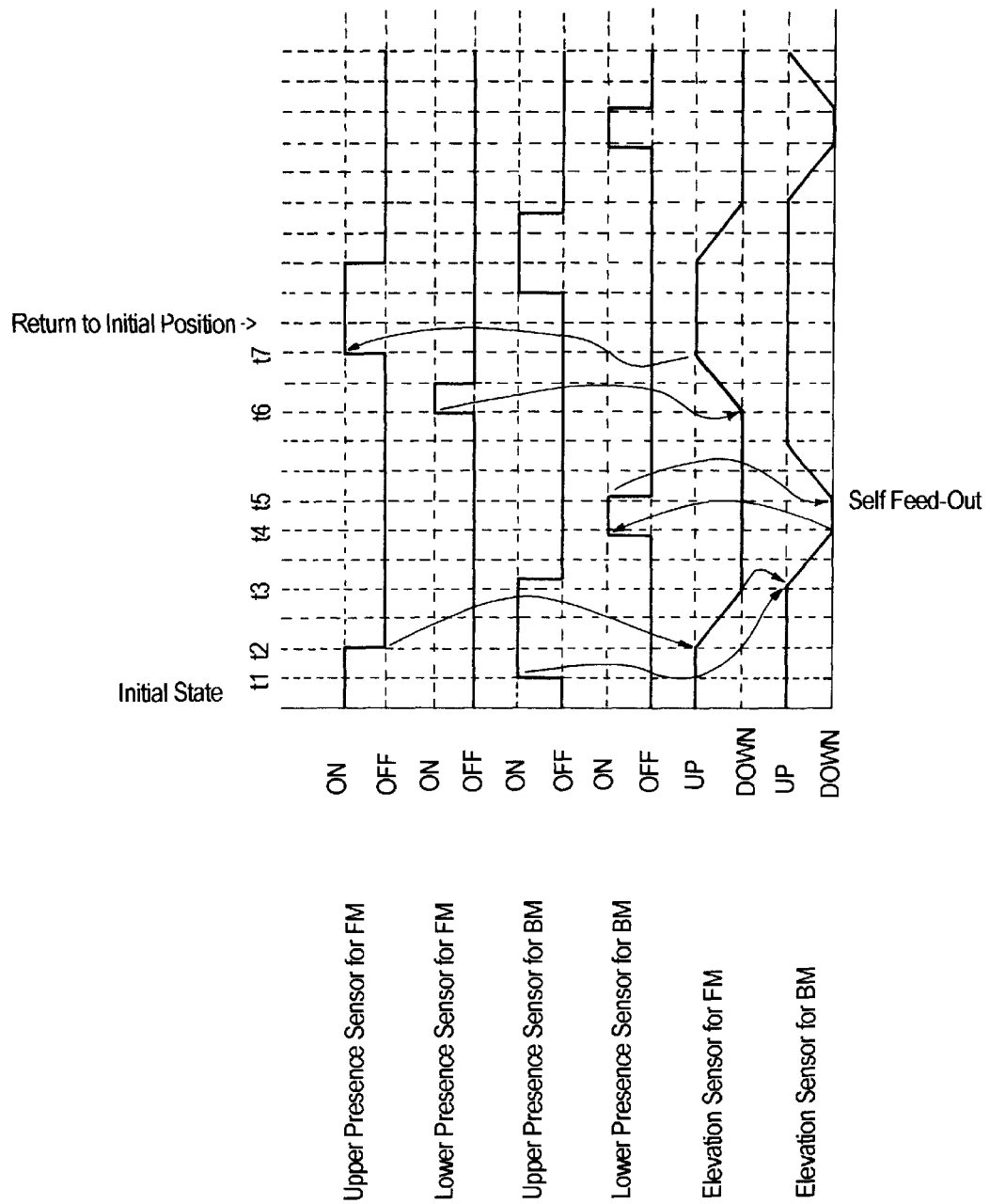
FIG. 16 is a timing chart of the aforementioned embodiment.

With reference to FIGS. 1 and 16, the elevating tables 121, 141 of the respective elevated conveyors 120, 140 initially are located in the upper transfer positions (see FIGS. 4 and 10), and a plurality of push carriages 110 are placed only on the rails 103 on the forward path PH1. In the initial state, one push carriage 110 is still on the elevating table 121 of the forwarding elevated conveyor 120 (see FIG. 4), whereas the returning elevated conveyor 140 is empty (see FIG. 10).

Operators P start the operation in this state, and the push carriage 110 at the downstream end of the forward path PH1 is first transferred onto the elevating table 141 of the returning elevated conveyor 140 by successively conveying the push carriages 110 standing in front of the respective work stations ST to the downstream side (see t1 of FIG. 16). The transferred push carriage 110 is locked, positioned or fixed temporarily on the elevating table 141 by the turning plate mechanism 145 in the aforementioned procedure of FIGS. 13(A) to 13(C) and is detected by the upper presence sensor S21 provided in the returning elevated conveyor 140. At this stage, the control unit 170 waits without driving the returning elevated conveyor 140 until the elevating table 121 of the forwarding elevated conveyor 120 is displaced to the lower transfer position.

On the other hand, the upper presence sensor S11 detects when the push carriage 110 on the forwarding elevated conveyor 120 is sent out onto the rails 103 of the forward path PH1 (see t2 of FIG. 16). Then, the control unit 170 drives the air cylinder 123 to lower the elevating table 121. Thus, the elevating table 121 is lowered to the lower transfer position to wait on standby so as to receive the returning push carriage 110. The control unit 170 lowers the returning elevating table 141 (see t3 of FIG. 16) when the forwarding elevated conveyor 120 is lowered to the lower transfer position and the push carriage 110 is present in the upper transfer position of the returning elevated conveyor 140.

Figure 11:
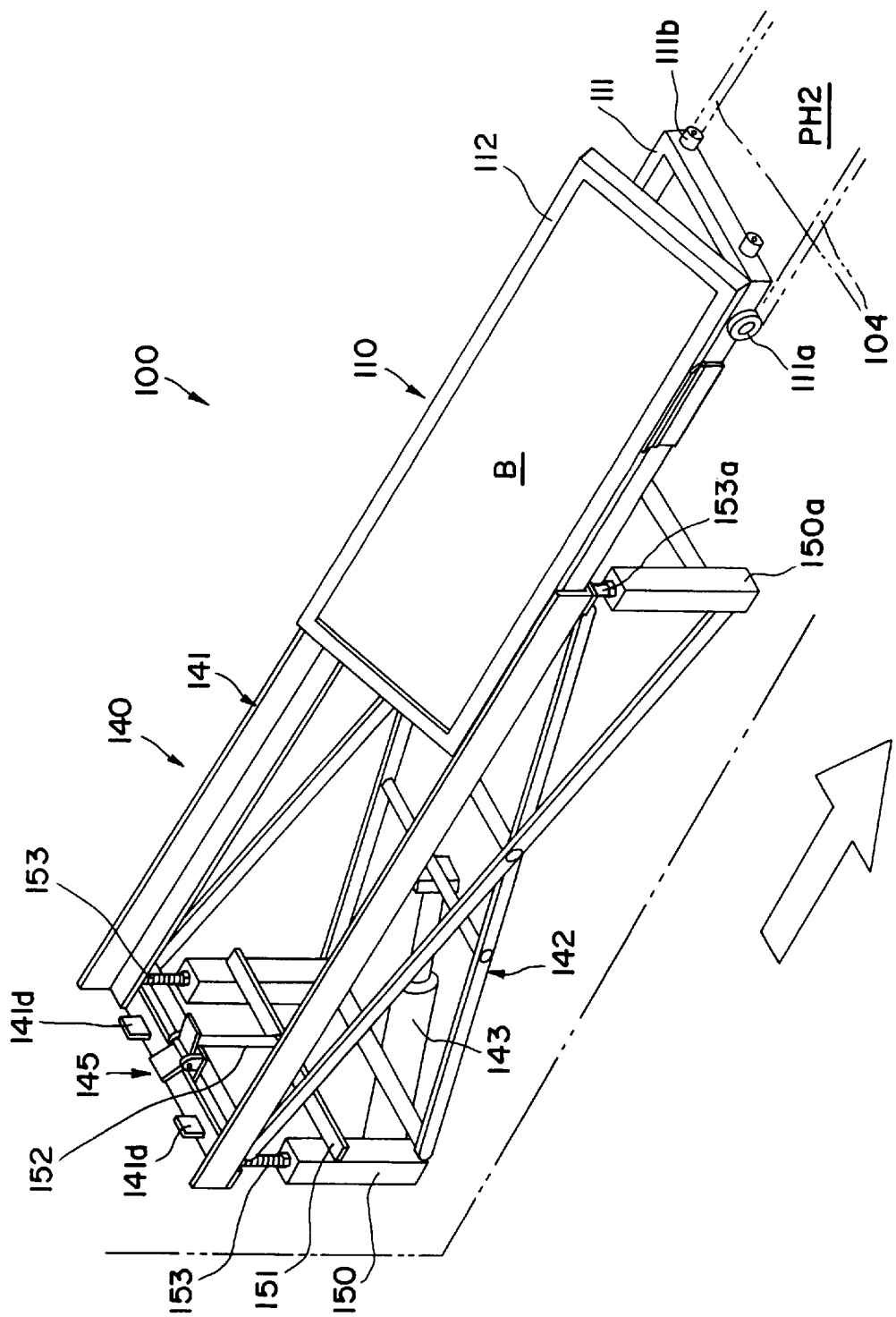

The lowering operation causes a release of the locking by the turning plate mechanism 145, and the elevating table 141 then is inclined, as described with reference to FIGS. 14(A) and 14(B). The inclination causes the push carriage 110 to be sent out onto the rails 104 of the return path PH2 by the action of gravity, as shown in FIG. 11, and enables the push carriage 110 to move to the downstream end of the rails 104 (see t4 to t5 of FIG. 16). Alternatively or additionally, the carriages 110 may be moved on the return path PH2 by a driving means such as a motor, a chain sprocket combination or the like. The elevating table 141 is returned to the upper transfer position immediately after the push carriage 110 is sent out and detected by the lower presence sensor S22 (see t5 of FIG. 16).

The returned push carriage 110 is guided onto the elevating table 121 of the forwarding elevated conveyor 120 waiting in the lower transfer position as shown in FIG. 6. Then, the push carriage 110 is temporarily locked or fixedly positioned on the elevating table 121 (see FIG. 7) in the procedure described with reference to FIGS. 9(A) to 9(C), and is detected by the lower presence sensor S12 (see t6 of FIG. 16).

The control unit 170 raises the elevating table 121 upon receipt of a detection signal of the lower presence sensor S12. Therefore, the elevated conveyor 120 returns to the state of FIG. 5 while carrying the push carriage 110 as shown in FIG. 7. As a result, the entire carriage conveying apparatus 100 returns to its initial state.

The return path PH2 for circulating the push carriages 110 is formed immediately below the forward path PH1 for conveying the push carriages 110 from one work station to another. Therefore, a circulating path that is fairly compact in plan view can be constructed. Accordingly, a maximally compact layout of the carriage conveying apparatus 100 can be achieved even if the elevated carriage conveying apparatus 100 is connected with an unillustrated main conveyor in a branched manner to build a production line.

Further, the return path PH2 is inclined to return the push carriages 110 by the action of gravity. Accordingly, the push carriages 110 on the return path PH2 can be returned automatically to the upstream side of the forward path PH1 without using a special driving source. Therefore, the operators can continuously do their work without being involved in the return of the push carriages 110.

The aforementioned embodiment is only an illustration of a preferred embodiment of the present invention, and the present invention is not limited thereto. Various design changes can be made without departing from the scope of the present invention. For example, the preferred embodiment was described with respect to manually pushed carriages. However, the invention is also applicable to externally and/or internally driven carriages.

As described above, quite a compact circulating path can be constructed, and the carriages can be automatically returned to the upstream side of the return path without using a special driving source. Thus, there is a significant effect of constructing an inexpensive elevating carriage conveying apparatus capable of efficiently circulating carriages even in a limited.

What is claimed is:

1. A carriage conveying apparatus, comprising:
   a forward path for moving carriages substantially linearly from one work station to another,
   a return path for moving the carriages from a downstream end of the forward path to an upstream end thereof, the return path being provided immediately below the forward path,
   a pair of conveyors connecting the forward path and the return path so that the carriages can be transferred from one to the other of the paths, the pair of conveyors comprising elevating tables elevated and lowered between upper transfer positions where the carriages can be transferred to and from the forward path and lower transfer positions where the carriages can be transferred to and from the return path, and driving units for elevating and lowering the elevating tables between the upper and lower transfer positions,
   at least one position detecting means for detecting at least one of the upper transfer position and the lower transfer position of the elevating tables in the corresponding transfer position, and
   a control unit for controlling operations of the driving units in accordance with signals from the position detecting means, wherein the control unit permits the elevating table at the upstream side of the return path to be lowered only when the elevating table at the downstream side of the return path is located in the lower transfer position.

2. A carriage conveying apparatus according to claim 1, wherein each driving unit comprises a parallel link for supporting the elevating table such that the elevating table can be elevated and lowered, and an air cylinder for driving the parallel link.

3. A carriage conveying apparatus according to claim 1, wherein the conveyors comprise temporary holding means for temporarily holding the carriage positioned thereon during the transfer from one to the other of the two paths.

4. A carriage conveying apparatus according to claim 1, wherein the return path is inclined such that the carriages return from an upstream side of the return path to a downstream side thereof at least partly by the action of gravity.

5. A carriage conveying apparatus according to claim 4, wherein the carriages are conveyed from the upstream end of the forward path to the downstream end thereof by being pushed manually by human operators.

* * * * *